United States Patent
Iida et al.

(10) Patent No.: US 7,126,813 B2
(45) Date of Patent: Oct. 24, 2006

(54) SOLID ELECTROLYTIC CAPACITOR AND METHOD OF MANUFACTURING SOLID ELECTROLYTIC CAPACITOR ANODE MATERIAL

(75) Inventors: Takahisa Iida, Hirakata (JP); Mutsumi Yano, Hirakata (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/373,332

(22) Filed: Mar. 13, 2006

(65) Prior Publication Data

US 2006/0215353 A1 Sep. 28, 2006

(30) Foreign Application Priority Data

Mar. 23, 2005 (JP) ............................. 2005-083031

(51) Int. Cl.
 *H01G 9/04* (2006.01)
 *H01G 9/145* (2006.01)
(52) U.S. Cl. ...................... 361/528; 361/532; 29/25.03
(58) Field of Classification Search ........ 361/523–524, 361/528, 532, 535
 See application file for complete search history.

(56) References Cited

U.S. PATENT DOCUMENTS

| 6,215,652 | B1 | 4/2001 | Yoshida et al. |
| 6,882,522 | B1* | 4/2005 | Naito et al. ................. 361/523 |
| 6,954,351 | B1* | 10/2005 | Konuma et al. ............ 361/523 |
| 2001/0003501 | A1* | 6/2001 | Hayashi et al. ............. 361/523 |
| 2003/0081374 | A1* | 5/2003 | Takada ........................ 361/523 |

FOREIGN PATENT DOCUMENTS

| JP | 6-151258 | 5/1994 |
| JP | 11-329902 | 11/1999 |

* cited by examiner

*Primary Examiner*—Eric W. Thomas
(74) *Attorney, Agent, or Firm*—Westerman, Hattori, Daniels & Adrian, LLP.

(57) ABSTRACT

A solid electrolytic capacitor comprising: an anode of niobium or niobium alloy; and a dielectric layer formed by anodizing the anode; wherein the anode comprises a surface layer of niobium silicide formed at an interface between the dielectric layer and itself, and silicon is contained in the dielectric layer.

5 Claims, 3 Drawing Sheets

4b 3 1 2
(4)

SOLID ELECTROLYTIC CAPACITOR AND METHOD OF MANUFACTURING SOLID ELECTROLYTIC CAPACITOR ANODE MATERIAL

RELATED APPLICATION

The priority application number Japanese Patent Application 2005-83031, filed Mar. 23, 2005, upon which this application is based is hereby incorporated by reference.

BACKGROUND OF THE INVENTION

1. Field of the Invention

The present invention relates to a solid electrolytic capacitor using niobium or niobium alloy for an anode and to a method of manufacturing anode material of said anode for said solid electrolytic capacitor. More particularly, a feature of the invention is to prevent increase of leakage current after heat treatment process, such as reflow soldering process.

2. Description of the Related Art

Generally, it has been proposed to fabricate a solid electrolytic capacitor by: anodizing an anode of valve metals, such as titanium, niobium, tantalum and the like or of alloy of which main component is valve metals, in phosphate solution to form a dielectric layer of oxide on the anode surface; overlaying an electrolyte layer composed of an oxide having a conductivity or a conductive polymer on the dielectric layer; and overlaying a carbon layer and a silver layer as a cathode on the electrolyte layer. (See, for example, Japanese Published Unexamined Patent Application No. 6-151258.)

However, the dielectric layer of oxide in such a solid electrolytic capacitor is easily affected by heat. Especially, the dielectric layer formed by anodizing an anode using niobium or niobium alloy is easy to be greatly affected by heat, and there has been a problem when heat treatment process, such as reflow soldering process, is conducted, a crack in the dielectric layer occurs by heat shrinkage of the anode and the electrolyte layer, and increase of leakage current is caused.

In recent years, in order to provide a solid electrolytic capacitor having little change in electric capacitance by heating of a reflow soldering process, the solid electrolytic capacitor in which a dielectric layer composed of a niobium oxide layer and a niobium nitride region is formed on the surface of an anode of niobium has been proposed. (See, for example, Japanese Published Unexamined Patent Application No. 11-329902.)

Nevertheless, a problem in the above-described solid electrolytic capacitor in which the dielectric layer composed of the niobium oxide layer and the niobium nitride region is formed on the surface of the anode of niobium has been that it is impossible to fully suppress occurrence of the crack in the dielectric layer which results in increase of leakage current.

SUMMARY OF THE INVENTION

It is an object of the present invention, in a solid electrolytic capacitor using niobium or niobium alloy for an anode therein, to suppress occurrence of a crack in a dielectric layer in a heat treatment process, such as reflow soldering process, and thereby to fully prevent increase of leakage current.

According to the invention, a solid electrolytic capacitor comprises an anode of niobium or niobium alloy and a dielectric layer formed by anodizing said anode, the anode comprises a surface layer of niobium silicide formed at an interface between the dielectric layer and itself, and silicon is contained in the dielectric layer.

In the solid electrolytic capacitor, it is preferable that the amount of silicon contained in the anode and the dielectric layer be within the range of from 1 to 10 wt % with respect to the total amount of niobium and silicon.

In the anode using niobium or niobium alloy, in the case of forming the surface layer of niobium silicide at the interface between the dielectric layer and itself, niobium or niobium alloy is electrolyzed in a molten salt including silicon in order to cover the niobium surface by niobium silicide. As such a molten salt, molten salts consist of molten lithium fluoride-potassium fluoride-sodium fluoride systems including potassium fluorosilicate may be used.

If the anode using niobium or niobium alloy comprises the surface layer of niobium silicide formed at the interface between the dielectric layer and itself the same as the present invention, even though the anode is subjected to heat shrinkage in the case of heat treatment process, such as reflow soldering process, thermal stress added to the dielectric layer is relieved because of niobium silicide whose heat-shrinkage responsiveness is high. Further, if silicon is contained in the dielectric layer as described above, heat-shrinkage responsiveness of the dielectric layer itself is improved because of silicon.

As a consequence, in the solid electrolytic capacitor of the invention, even though the anode and the electrolyte layer are subjected to heat shrinkage in the case of heat treatment process, such as reflow soldering process, thermal stress added to the dielectric layer is relieved and occurrence of the crack in the dielectric layer is prevented, so that increase of leakage current is prevented.

If the amount of silicon contained in the anode and the dielectric layer is small in the case of containing silicon in the dielectric layer together with forming the surface layer of niobium silicide at the interface between the dielectric layer and the anode, it becomes impossible to relieve thermal stress added to the dielectric layer by niobium silicide, or to fully improve heat-shrinkage responsiveness of the dielectric layer itself, so that it becomes impossible to fully prevent increase of leakage current after heat treatment process, such as reflow soldering process. On the other hand, if the amount of silicon contained in the anode and the dielectric layer is large, heat-shrinkage responsiveness is lowered because of crystallization of niobium silicide and it becomes impossible to fully relieve thermal stress added to the dielectric layer, so that fully prevention of increase of leakage current in the case of heat treatment process, such as reflow soldering process, becomes impossible.

In the solid electrolytic capacitor of the present invention, if the amount of silicon contained in the anode and the dielectric layer is within the range of from 1 to 10 wt % with respect to the total amount of niobium and silicon, even though the anode and the electrolyte layer are subjected to heat shrinkage in the case of heat treatment process, such as reflow soldering process, thermal stress added to the dielectric layer is fully relieved and occurrence of the crack in the dielectric layer is suppressed, so that increase of leakage current is prevented.

In forming the surface layer of niobium silicide at the interface between the dielectric layer and the anode, niobium or niobium alloy is electrolyzed in the molten salt including silicon, then, by such an electrolysis, the surface layer of niobium silicide is formed at the interface between the dielectric layer and the anode. Then, it becomes possible to contain silicon in the dielectric layer formed on the anode by anodizing the resultant anode comprising the surface layer of niobium silicide.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Hereinbelow, solid electrolytic capacitors according to embodiments of the invention are specifically described with reference to the accompanying drawings. It is to be noted that the solid electrolytic capacitors of the invention should not be limited to the following examples thereof and suitable changes and modifications may be made thereto within the scope of the invention.

Figure 1:
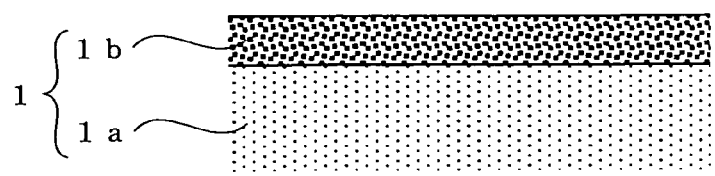
FIG. 1 is a partial enlarged view illustrating an anode of which surface of niobium or niobium alloy is covered by niobium silicide in embodiments of the present invention.

In a solid electrolytic capacitor of embodiments of the invention, as shown in FIG. 1, in an anode 1, the surface of a substrate 1a of niobium or niobium alloy is covered by a surface layer 1b of niobium silicide.

Figure 2:
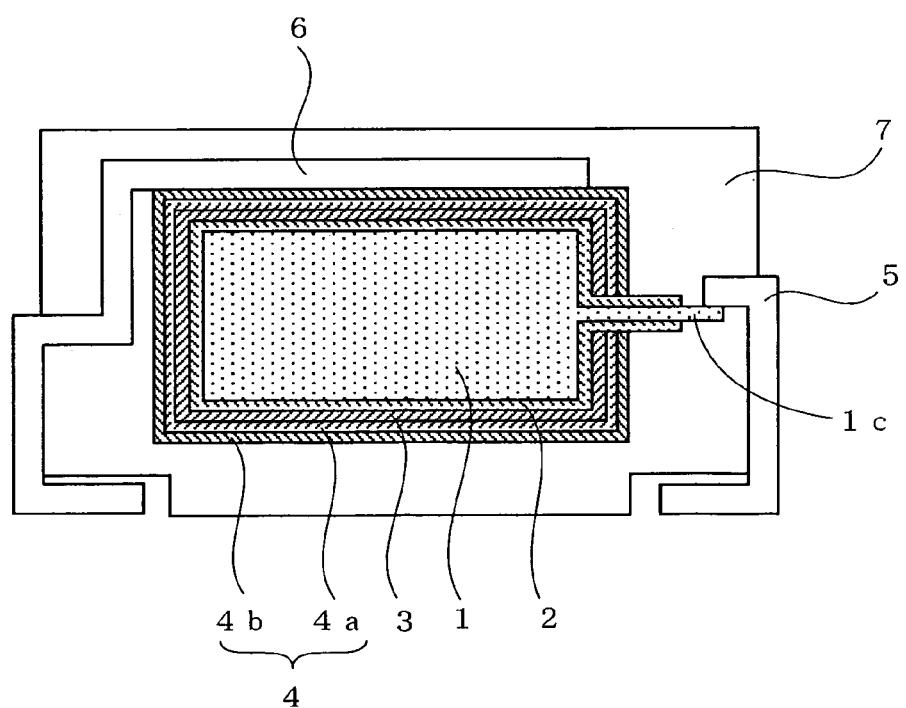
FIG. 2 is a schematic sectional view showing a solid electrolytic capacitor according to an embodiment of the present invention.

In an embodiment, as shown in FIG. 2, a dielectric layer 2 of niobium oxide containing silicon is formed on the surface of the anode 1 by leading a lead 1c out of the anode 1 and anodizing the anode 1 in an aqueous electrolyte.

After forming the dielectric layer 2 on the surface of the anode 1, an electrolyte layer 3 is formed to cover the surface of the dielectric layer 2, and a cathode 4 wherein a carbon layer 4a using carbon paste and a silver layer 4b using silver paste is deposited is formed to cover the surface of the electrolyte layer 3.

Examples of materials used for the electrolyte layer 3 include conducting polymer materials, such as polypyrrole, polythiophene or polyaniline, or conducting oxides, such as manganese dioxide.

In the solid electrolytic capacitor according to the embodiment, an anode lead 5 is connected to the lead 1c led out of the anode 1, a cathode lead 6 is connected to the silver layer 4b of the cathode 4, and the solid electrolytic capacitor is encapsulated with a resin layer 7 of an insulating resin, such as epoxy resin, to thrust the anode lead 5 and the cathode lead 6 outside.

Figure 3:
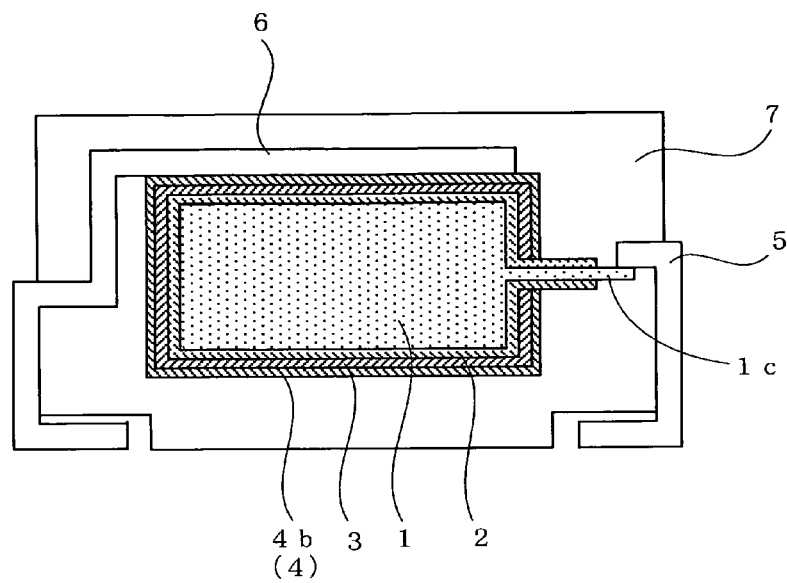
FIG. 3 is a schematic sectional view illustrating a solid electrolytic capacitor without providing a carbon layer in a cathode according to another embodiment.

In the solid electrolytic capacitor of the embodiment shown in FIG. 2, the carbon layer 4a and the silver layer 4b are deposited as the cathode 4, however, it is possible to provide a cathode 4 of only a silver layer 4b without forming the above mentioned carbon layer 4a to cover the surface of the electrolyte layer 3 as shown in FIG. 3.

Hereinbelow, solid electrolytic capacitors and methods of manufacturing solid electrolytic capacitor anode materials according to examples of the invention are specifically described, and it will be demonstrated by the comparison with comparative examples that increase of leakage current of the inventive solid electrolytic capacitors of Examples is prevented in the case of heat treatment process, such as reflow soldering process. It is to be noted that the solid electrolytic capacitors and methods of manufacturing the solid electrolytic capacitor anode materials of the invention should not be limited to the following examples thereof and suitable changes and modifications may be made thereto within the scope of the invention.

EXAMPLE 1

Figure 4:
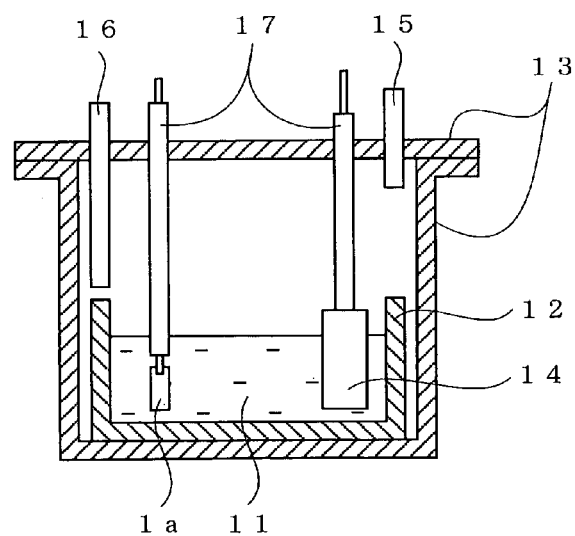
FIG. 4 is a sectional view illustrating an apparatus utilized for covering the surface of a substrate of niobium or niobium alloy by niobium silicide in Examples of the present invention.

In a solid electrolytic capacitor of Example 1, in fabricating an anode 1, a substrate 1a of porous sintered body of niobium formed by sintering powder of niobium metal having an average particle size of 2 μm was used and the surface of the substrate 1a was covered by a surface layer 1b of niobium silicide by utilizing an apparatus shown in FIG. 4.

In the apparatus shown in FIG. 4, a molten salt 11 of lithium fluoride-sodium fluoride-potassium fluoride-potassium fluorosilicate at a temperature of 550° C. was put into an alumina crucible 12 and the alumina crucible 12 was accommodated in a stainless steel container 13. Further, the substrate 1a of porous sintered body of niobium, and a carbon rod 14 were soaked in the molten salt 11. Still further, the carbon rod 14 as an anode and the substrate 1a as a cathode were subjected to cathodic reduction for 30 minutes to form the anode 1 comprising a surface layer 1b of niobium silicide on the surface of the substrate 1a shown in FIG. 1 as mentioned above. In FIG. 4, 15 is an exhaust pipe, 16 is an expiration pipe and 17 is an alumina pipe for insulation.

A dielectric layer 2 on the surface of the anode 1 wherein the substrate 1a was covered by the surface layer 1b of niobium silicide was formed as follows. The anode 1 was anodized by applying a voltage of 8 V for 10 hours between the anode 1 and an opposite electrode in 0.1 wt % aqueous solution of ammonium hexafluorosilicate at a temperature of 60° C. used as an aqueous electrolyte, and the dielectric layer 2 was formed on the surface of the resultant anode 1.

As shown in FIG. 2, an electrolyte layer 3 of polypyrrole was formed on the dielectric layer 2 formed on the surface of the anode 1 by chemical polymerization, and so on, and a cathode 4 comprising a carbon layer 4a and a silver layer 4b was formed on the electrolyte layer 3. Then, the solid electrolytic capacitor was fabricated as follows. An anode lead 5 was connected to the lead 1c led out of the anode 1, a cathode lead 6 was connected to the silver layer 4b of the cathode 4, and the solid electrolytic capacitor was encapsulated with a resin layer 7 of epoxy resin, to thrust the anode lead 5 and the cathode lead 6 outside via the resin layer.

Figure 5:
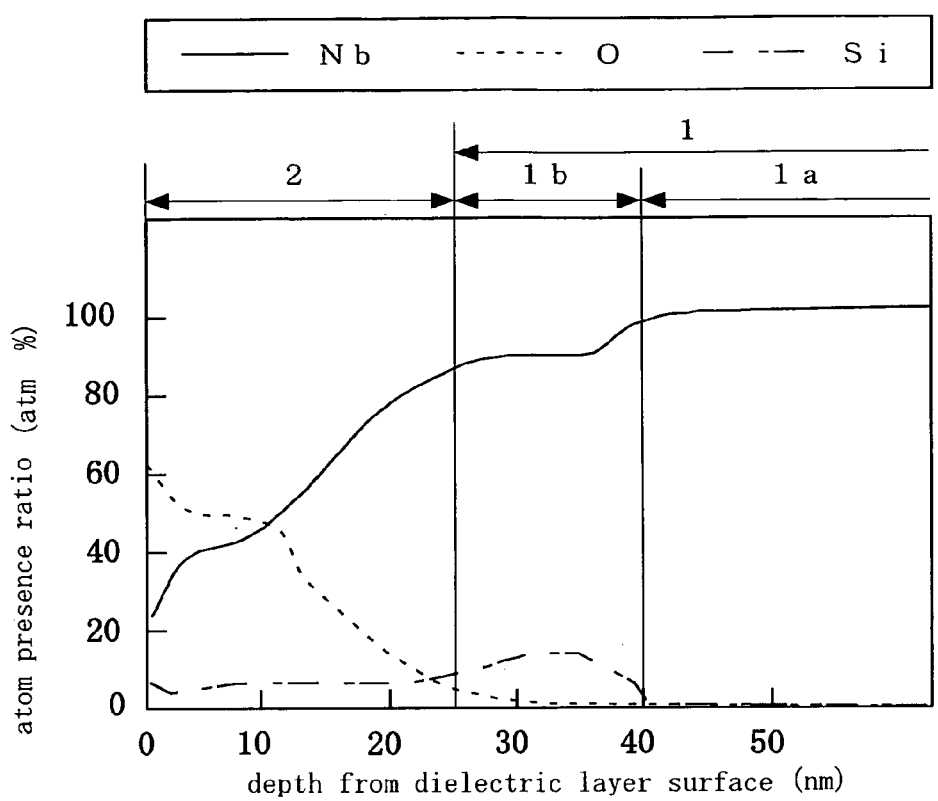
FIG. 5 is a graph showing the result of measuring atom presence ratio of each element in a depth direction from the surface of a dielectric layer formed on an anode in a solid electrolytic capacitor of Example 1.

In the dielectric layer 2 formed on the surface of the anode 1, at a stage that the anode 1 was anodized, content of each element was measured by energy dispersive x-ray analysis (EDX) in a depth direction from the surface of the dielectric layer 2 which was the opposite side of the anode 1. The result was shown in FIG. 5.

As a consequence, the dielectric layer 2 was formed in the range of depth of about 25 nm from the surface thereof, and silicon was contained, in addition to niobium and oxygen, in the dielectric layer 2. Further, niobium silicide presented in a region in the range of depth from about 25 nm to 40 nm from the surface of the dielectric layer 2, and the region was the surface layer 1b of niobium silicide. The region of not less than about 40 nm depth from the surface of the dielectric layer 2 was the substrate 1a of niobium.

After forming the dielectric layer 2 on the surface of the anode 1, the amount of silicon contained in the anode 1 and the dielectric layer 2 was measured with a colorimetric analysis method. As a result, the amount of silicon contained in the anode 1 and the dielectric layer 2 was 5 wt % with respect to the total amount of niobium and silicon contained in the anode 1 and the dielectric layer 2.

EXAMPLE 2

The same procedure as in Example 1 was used to fabricate a solid electrolytic capacitor of Example 2, except that a substrate 1a of porous sintered body of niobium alloy formed by sintering a mixture wherein powder of niobium metal having an average particle size of 2 μm were mixed with powder of tantalum metal having an average particle size of 2 μm at a weight ratio of 99:1 was used.

COMPARATIVE EXAMPLE 1

The same procedure as in Example 1 was used to fabricate a solid electrolytic capacitor of Comparative Example 1, except that a substrate of porous sintered body of niobium formed by sintering powder of niobium metal having an average particle size of 2 μm was used and the substrate surface was not covered by niobium silicide.

COMPARATIVE EXAMPLE 2

The same procedure as in Example 1 was used to fabricate a solid electrolytic capacitor of Comparative Example 2, except that an anode was fabricated by bring a substrate of porous sintered body of niobium formed by sintering powder of niobium metal having an average particle size of 2 μm into nitrogen gas at a temperature of 300° C. to cover the substrate surface by niobium nitride.

Then, each of the resultant solid electrolytic capacitors of Examples 1 and 2 and Comparative Examples 1 and 2 was measured of leakage current in the case of reflow soldering process.

In order to reflow each of the resultant solid electrolytic capacitors, the solid electrolytic capacitors were heat-treated by air reflowing method at a peak temperature of 240° C. for 5 minutes. Then, a voltage of 5 v was applied for 20 seconds to each of the solid electrolytic capacitors after reflow soldering process to measure leakage current. The results were shown in Table 1 below.

TABLE 1

|  | SUBSTRATE MATERIAL | MATERIAL FOR COVERING SUBSTRATE SURFACE | LEAKAGE CURRENT (μA) |
| --- | --- | --- | --- |
| EXAMPLE 1 | niobium | niobium silicide | 200 |
| EXAMPLE 2 | niobium alloy | niobium silicide | 180 |
| COMPARATIVE EXAMPLE 1 | niobium | — | 800 |
| COMPARATIVE EXAMPLE 2 | niobium | niobium nitride | 380 |

As apparent from the table, in the solid electrolytic capacitors of Examples 1 and 2 using the anode 1 wherein the surface of the substrate 1a of niobium or niobium alloy was covered by the surface layer 1b of niobium silicide and forming the dielectric layer 2 containing niobium on the surface of the anode 1 by anodizing the resultant anode 1, leakage current after reflow soldering process was remarkably decreased as compared with the solid electrolytic capacitor of Comparative Example 1 using the anode wherein the surface of the substrate of niobium was not covered by niobium silicide. Further, in the solid electrolytic capacitors of Examples 1 and 2, leakage current after reflow soldering process was greatly decreased as compared with the solid electrolytic capacitor of Comparative Example 2 using the anode wherein the surface of the niobium substrate was covered by niobium nitride.

EXAMPLES 3 to 9

In Examples 3 to 9, the same procedure as in Example 1 was used to fabricate each solid electrolytic capacitor, except only that time for cathodic reduction of substrate 1a for covering the surface of the substrate 1a of porous sintered body of niobium by a surface layer 1b of niobium silicide by utilizing the apparatus shown in FIG. 4 was changed.

Each time for cathodic reduction of the substrate 1a was set to 3 minutes in Example 3, to 6 minutes in Example 4, to 12 minutes in Example 5, to 1 hour in Example 6, to 1 hour and 12 minutes in Example 7, to 1.5 hours in Example 8, and to 2 hours in Example 9.

After forming the dielectric layer 2 on the surface of the anode 1, the amount of silicon contained in the anode 1 and the dielectric layer 2 was measured with the colorimetric analysis method in each solid electrolytic capacitor of Comparative Examples 3 to 9 in the same manner in the case of Example 1. As a result, the amount of silicon contained in the anode 1 and the dielectric layer 2 was 0.5 wt % in Example 3, 1.0 wt % in Example 4, 2.0 wt % in Example 5, 7.5 wt % in Example 6, 10 wt % in Example 7, 12 wt % in Example 8, and 15 wt % in Example 9.

Next, the same as Example 1, the solid electrolytic capacitors of Example 3 to 9 were heat-treated by air reflowing method at a peak temperature of 240° C. for 5 minutes. Then, a voltage of 5 v was applied for 20 seconds to each of the solid electrolytic capacitors after reflow soldering process to measure leakage current. The results were shown together with that of Example 1 in Table 2 below.

TABLE 2

|  | TIME FOR CATHODIC REDUCTION | AMOUNT OF SILICON (wt %) | LEAKAGE CURRENT (μA) |
| --- | --- | --- | --- |
| EXAMPLE 3 | 3 minutes | 0.5 | 700 |
| EXAMPLE 4 | 6 minutes | 1.0 | 240 |
| EXAMPLE 5 | 12 minutes | 2.0 | 210 |
| EXAMPLE 1 | 30 minutes | 5.0 | 200 |
| EXAMPLE 6 | 1 hour | 7.5 | 210 |
| EXAMPLE 7 | 1 hour and 12 minutes | 10 | 240 |
| EXAMPLE 8 | 1.5 hours | 12 | 400 |
| EXAMPLE 9 | 2 hours | 15 | 600 |

As a consequence, in each of the solid electrolytic capacitors of Examples 3 to 9, leakage current after reflow soldering process was remarkably decreased as compared with the solid electrolytic capacitor of Comparative Example 1 using the anode wherein the substrate of niobium was not covered by the surface layer of niobium silicide. Particularly, the solid electrolytic capacitors of Examples 1 and 4 to 7 wherein the amount of silicon contained in the anode 1 and the dielectric layer 2 was within the range of from 1 to 10 wt % with respect to the total amount of niobium and silicon contained in the anode 1 and the dielectric layer 2 showed greatly decreased leakage current after reflow soldering process. Further, the solid electrolytic capacitors of Examples 1, 5 and 6 wherein the amount of silicon was within the range of from 2 to 7.5 wt % showed more greatly decreased leakage current after reflow soldering process.

Although the present invention has been fully described by way of examples, it is to be noted that various changes and modifications will be apparent to those skilled in the art.

Therefore, unless otherwise such changes and modifications depart from the scope of the invention, they should be construed as being included therein.

The invention claimed is:

1. A solid electrolytic capacitor comprising: an anode of niobium or niobium alloy; and a dielectric layer formed by anodizing said anode;
wherein the anode comprises a surface layer of niobium silicide formed at an interface between said dielectric layer and itself, and silicon is contained in the dielectric layer.

2. The solid electrolytic capacitor according to claim 1, wherein the amount of silicon contained in the anode and the dielectric layer is within the range of from 1 to 10 wt % with respect to the total amount of niobium and silicon.

3. The solid electrolytic capacitor according to claim 1, wherein the amount of silicon contained in the anode and the dielectric layer is within the range of from 2 to 7.5 wt % with respect to the total amount of niobium and silicon.

4. A method of manufacturing solid electrolytic capacitor anode material comprising the steps of: electrolyzing niobium or niobium alloy in a molten salt including silicon; and covering the surface thereof by niobium silicide.

5. The method of manufacturing solid electrolytic capacitor anode material according to claim 4, wherein said molten salt includes lithium fluoride, potassium fluoride, sodium fluoride and potassium fluorosilicate.

* * * * *